(12) United States Patent
Blanke et al.

(10) Patent No.: US 8,315,750 B2
(45) Date of Patent: Nov. 20, 2012

(54) EFFICIENCY OPTIMIZING PROPELLER SPEED CONTROL FOR SHIPS

(75) Inventors: Mogens Blanke, Farum (DK); Luca Pivano, Trondheim (NO)

(73) Assignee: Propeller Control ApS, Farum (DK)

( * ) Notice: Subject to any disclaimer, the term of this patent is extended or adjusted under 35 U.S.C. 154(b) by 32 days.

(21) Appl. No.: 12/672,945

(22) PCT Filed: Aug. 14, 2008

(86) PCT No.: PCT/DK2008/050199
§ 371 (c)(1),
(2), (4) Date: Jul. 15, 2010

(87) PCT Pub. No.: WO2009/021522
PCT Pub. Date: Feb. 19, 2009

(65) Prior Publication Data
US 2011/0208377 A1    Aug. 25, 2011

(30) Foreign Application Priority Data

Aug. 14, 2007  (DK) .................................. 2007 01159

(51) Int. Cl.
*B60L 3/00* (2006.01)
*B63H 21/20* (2006.01)
*B63H 5/10* (2006.01)
*F01D 15/10* (2006.01)
*B60K 17/35* (2006.01)

(52) U.S. Cl. ..................... 701/21; 440/3; 440/6; 440/49; 440/74; 440/75; 440/79; 440/81; 440/86; 440/87; 416/129; 290/52; 180/249

(58) Field of Classification Search .................... 701/21; 440/3, 6, 49, 74, 75, 79, 81, 86, 87; 416/129; 290/52; 180/249
See application file for complete search history.

(56) References Cited

U.S. PATENT DOCUMENTS

| 4,661,714 A | 4/1987 | Satterthwaite et al. |
| 4,719,861 A * | 1/1988 | Savage et al. .................. 104/165 |
| 5,336,120 A | 8/1994 | Maurer et al. |
| 5,413,461 A | 5/1995 | Johnsen |

(Continued)

FOREIGN PATENT DOCUMENTS

CN    1137462 A    12/1996

(Continued)

OTHER PUBLICATIONS

Becerra, Victor M. "Solving Optimal Control Problems With State Constraints Using Nonlinear Programming and Simulation Tools" IEEE Transactions on Education, Aug. 2004, pp. 377-384, vol. 47, No. 3.

(Continued)

*Primary Examiner* — James Trammell
*Assistant Examiner* — Majdi Alsomiri

(57) ABSTRACT

The invention relates to a method for improving the propulsion efficiency of vessels. The improvement is obtained by utilizing wave induced variations in propeller inflow, i.e. the speed of water flowing towards the propeller. The wave induced water speed variation is used to calculate the propeller speed in a way so that the propeller speed is optimal with respect to the total propulsion efficiency. The optimal propeller speed is determined by solving an optimization problem formulated as the maximization of the ratio of energy delivered by the propeller and the energy delivered to the propeller. The method may be used for vessels with one or more propellers.

17 Claims, 13 Drawing Sheets

U.S. PATENT DOCUMENTS

| | | | |
|---|---|---|---|
| 6,193,194 B1 * | 2/2001 | Minovitch | 244/171.3 |
| 2002/0185046 A1 | 12/2002 | Motsenbocker | |
| 2003/0060094 A1 | 3/2003 | Motsenbocker | |
| 2009/0088936 A1 * | 4/2009 | Hubbard et al. | 701/54 |
| 2011/0208377 A1 * | 8/2011 | Blanke et al. | 701/21 |

FOREIGN PATENT DOCUMENTS

| | | |
|---|---|---|
| CN | 101462590 A | 6/2009 |
| WO | WO 92/06890 | 4/1992 |

OTHER PUBLICATIONS

Blanke, M. et al., "The marine engine governor" Proceedings Second International Conference on Maritime Communications and Control, Society of Marine Engineers, London, UK, Nov. 21-23, 1990, pp. 11-20.

Blanke, Mogens et al., "Dynamic Model for Thrust Generation of Marine Propellers" Proc. IFAC Conference MCMC, 2000.

Carlton, J.S. "Martine propellers and propulsion" Oxford, U.K.: Butterworth-Heinemann Ltd., Chapter 12—Ship resistance and propulsion, 1994, pp. 287-318.

Fosen, Thor I. et al., "Nonlinear Output Feedback Control of Underwater Vehicle Propellers using Feedback form Estimated Axial Flow Velocity" IEEE Journal of Oceanic Engineering, 2000, pp. 241-255, vol. 25, No. 2.

Manen, J.D. Van et al., Principles of Naval Architecture, vol. II: Resistance, Propulsion and Vibration, $3^{rd}$ Ed., Society of Naval Architects and Marine Engineers.

Narendra, Kumpati S. et al., "Identification and Control of Dynamical Systems Using Neural Networks" IEEE Transactions on Neural Networks, Mar. 1990, p. 4-27, vol. 1, No. 1.

Pivano, Luca et al., "Experimental Validation of a Marine Propeller Thrust Estimation Scheme" $7^{th}$ IFAC Conference on Manoeuvring and Control of Marine Craft, Lisbon, 2006.

Smogeli, Øyvind N. et al., "Experimental Validation of Power and Torque Thruster Control" Proceedings of the 13th Mediterranean Conference on Control and Automation Limassol, Cyprus, Jun. 27-29, 2005 pp. 1506-1511.

Hendricks, et al., Minimum Energy Control of a Large Diesel Engine, SAE Technical Paper Series, 1986, pp. 1-10, SAE The Engineering Resource for Advancing Mobility, Milwaukee, Wisconsin.

Hendricks, et al., Adaptive Minimum Energy Control of Large Ship Diesel Engines, 1986, pp. 231-236.

\* cited by examiner

| Symbol | Description | Unit |
|---|---|---|
| $D$ | propeller diameter | $m$ |
| $I$ | shaft moment of inertia | $kgm^2$ |
| $J$ | advance number | - |
| $K_T$ | open-water thrust coefficient | - |
| $K_Q$ | open-water torque coefficient | - |
| $m$ | ship's mass plus added mass | $kg$ |
| $n$ | propeller shaft speed | $rad/s$ |
| $R(u)$ | hull resistance | $N$ |
| $Q$ | shaft load torque | $Nm$ |
| $Q_p$ | propeller torque | $Nm$ |
| $Q_f$ | friction torque | $Nm$ |
| $Q_m$ | motor torque | $Nm$ |
| $T_p$ | propeller thrust | $N$ |
| $t_d$ | thrust deduction number | - |
| $u$ | ship speed | $m/s$ |
| $u_a$ | advance speed | $m/s$ |
| $u_w$ | induced water speed | $m/s$ |
| $U_a$ | nominal advance speed | $m/s$ |
| $u_{w0}$ | induced water speed amplitude | $m/s$ |
| $w_f$ | wake fraction | - |
| $h$ | propeller submergence | $m$ |
| $\zeta$ | wave amplitude | $m$ |
| $\eta$ | total efficiency | % |
| $\eta_p$ | propeller efficiency | % |
| $\rho$ | water density | $Kg/m^3$ |
| $\tau_w$ | wave period | $s$ |

FIG. 9

| Parameter | Value | Description |
|---|---|---|
| $D$ | $0.25m$ | Propeller diameter |
| $Z$ | 4 | Number of blades |
| $P/D$ | 1 | Pitch ratio P/D |
| $A_e/A_0$ | 0.55 | Expanded blade area ratio |

FIG. 10

| Controller | $\eta$ | $\eta_p$ |
|---|---|---|
| shaft speed | 0.3942 | 0.429 |
| Torque | 0.3988 | 0.435 |
| Offline $\eta$ optimizing | 0.4055 | 0.445 |

FIG. 11

EFFICIENCY OPTIMIZING PROPELLER SPEED CONTROL FOR SHIPS

CROSS REFERENCE TO RELATED APPLICATIONS

This application claims the benefit and priority to and is a U.S. National Phase Application of PCT International Application Number PCT/DK2008/050199, filed on Aug. 14, 2008, designating the United States of America and published in the English language, which is an International Application of and claims the benefit of priority to Danish Patent Application No. PA 2007 01159, filed on Aug. 14, 2007. The disclosures of the above-referenced applications are hereby expressly incorporated by reference in their entireties.

FIELD OF THE INVENTION

The invention relates to propeller control of vessels and in particular to improving propulsion efficiency by propeller control.

BACKGROUND OF THE INVENTION

Large vessels such as container ships and tankers on ocean passage consume large amounts of fuel. The large consumption of fuel constitutes a considerable increasing percentage of shipping companies' expenses due to increasing oil prices. Also from an environmental point of view the large consumption of fuel for transportation of goods by vessels is a problem. Accordingly, it is desirable to reduce vessels' fuel consumption and increase vessels' propulsion efficiency.

EP0551367 discloses a method for achieving optimum utilization of engine power to a ship's propeller, where a computer is used in a regulating loop which continuously controls the power by regulating the output from the ships engine, and optionally regulating the pitch angle for the propeller blades, as well as the number of revolutions of the propeller shaft, so that the longitudinal net force in the propeller shaft is monitored continuously by a force sensor and used as a main parameter for controlling the power, in such a manner that the net force is all the time optimized in relation to propeller efficiency and economic engine fuel consumption. The method of EP0551367 may be disadvantageous since it requires the use of a device for monitoring the longitudinal net force in the propeller shaft.

Whereas EP0551367 discloses a method that aims at improving propeller efficiency, it would be advantageous to improve vessels' efficiency even further by use of alternative methods for propeller control.

SUMMARY OF THE INVENTION

The invention preferably seeks to mitigate, alleviate or eliminate one or more of the above mentioned disadvantages singly or in any combination. In particular, it may be seen as an object of the present invention to provide a system for improving propeller efficiency for vessels.

This object and several other objects are obtained in a first aspect of the invention by providing a method for increasing propulsion efficiency of a vessel in waves by controlling the propeller shaft speed using a computed optimal propeller shaft speed, the vessel comprising a propeller driven by an engine and a controller for controlling the propeller shaft speed, the method comprises estimating a propeller inflow speed, the inflow speed comprising a speed component of wave induced inflow speed caused by waves passing the propeller, and computing the optimal propeller shaft speed as a function of the propeller inflow speed, where computing the optimal propeller shaft speed is based on maximising a propulsion efficiency.

The invention is particularly, but not exclusively, advantageous for improving propeller efficiency.

Accordingly, a method for increasing the efficiency of ships, tankers and submarines is provided using shaft speed control for increasing propeller efficiency. The vessel comprises one or more propellers driven by one or more engines. And the vessel comprises one or more controllers, e.g. shaft speed controllers, used for controlling the propeller shaft speed of the one or more propellers. The method may be utilised in existing propeller shaft speed controllers, by supplying the controller with a reference input signal which has been determined based on the propeller inflow speed. Accordingly, the method may be seen to improve efficiency by utilising the variations in water speed caused by waves. The utilisation of waves may be achieved according to the method by computing an optimal propeller shaft speed. The propeller shaft speed may be seen to be optimal by optimally utilising the wave induced variations in water speed with respect to the propeller efficiency. Thus, the optimal propeller shaft speed may be determined by maximising propulsion efficiency for a given value of propeller inflow speed. Maximising propulsion efficiency may be seen as a mathematical maximising of an energy function that represents propeller efficiency. Accordingly the propeller efficiency may be equated as various energy functions that quantify e.g. the power of the propeller compared to the power supplied to the vessel's engine.

The obtained optimal propeller shaft speed may be supplied to the propeller shaft speed controller as a reference input signal.

The maximising of propulsion efficiency may be obtained as a solution of a nonlinear optimisation problem so as to increase the average propulsion efficiency.

It may be advantageous to optimise the propulsion efficiency by utilising the propeller inflow speed, or variations of the inflow speed, since this optimisation may be implemented in a vessel without performing any expensive modifications of the vessel. In fact the method for determining the optimum propeller speed may be implemented by modifying part of the existing propeller controller of the vessel, which in modern vessels is implemented as a software controller implemented in a computer. Clearly, the modification of a software implemented propeller controller, even though it is not trivial task, may not require expensive changes of the existing computers used for the controller.

In an embodiment of the invention the propulsion efficiency may be the ratio of power delivered to propel the vessel and power consumed by the engine.

Accordingly, computing the optimal propeller shaft speed may be based on solving an optimisation problem formulated as an optimisation of an average of the ratio of power delivered to propel the ship and power consumed by the engine.

In an embodiment the optimal propeller shaft speed may be computed using a static mapping function which maps a value of the propeller inflow speed (or advance speed) to a value of the optimal propeller shaft speed. The static mapping function, e.g. a look-up table or a polynomial or piecewise linear function— which may have been determined by solving an optimisation problem for the purpose of maximising propulsion efficiency—may be used in a propeller controller for improving the total propulsion efficiency.

In an embodiment the optimal propeller shaft speed may be computed using a static mapping function which maps a variation of the inflow speed to a variation of the optimal propeller shaft speed. It may be advantageous to map variations instead of absolute values, since variations may provide a simple controller design. The variation of the advance speed may be obtained using a low pass filter or by other computing methods.

In an embodiment the static mapping function may be determined based on maximising the propulsion efficiency, for example by maximising the ratio of power delivered to propel the vessel and power consumed by the engine.

In an embodiment the computation of the optimal propeller shaft speed based on maximising the propulsion efficiency may be computed as the solution to an optimisation problem subjected to the constraint of maintaining a constant vessel speed and/or the constraint of limiting the amplitude of thrust fluctuations or limiting the deviation from average thrust. It may be advantageous to constrain vessel speed variations and thrust fluctuations in order to decrease wear of the main engine and other propeller drive components.

In an embodiment the propeller inflow speed may be computed from a measured propeller torque. It may be an advantage to compute, i.e. to estimate, the inflow speed since it may be difficult or require expensive equipment for measuring the inflow speed.

In an embodiment the propeller inflow speed is computed from an estimated propeller torque, where the estimated propeller torque is computed based on measured motor torque and measured shaft speed. It is understood that the propeller inflow speed may be estimated using alternative method.

An embodiment comprises
computing a variation of the propeller inflow speed from an average of the a propeller inflow speed,
computing a variation of the shaft speed from the variation of the propeller inflow speed, where
the optimum shaft speed is computed from the computed variation of the shaft speed and a reference shaft speed.

For example, the optimum shaft speed may be computed by adding the variation of the shaft speed to a reference shaft speed.

In an embodiment the inflow speed may be assumed periodic with a wave period and the optimal propeller shaft speed may be computed by maximising a ratio of power delivered to the propeller and power consumed by the engine averaged over an integer number of the wave periods. Thus, in an embodiment the optimisation problem may be formulated assuming a given wave period of the inflow speed.

In an embodiment the optimum propeller speed may be determined as a function of the inflow speed, where the optimum propeller speed is determined under the constraint of maximising the power efficiency of the propeller propulsion. It may be advantageous to optimise or maximise the propulsion efficiency by utilising the inflow speed for determining the optimum propeller speed, i.e. which is optimum in the sense of optimising the propulsion efficiency.

In an embodiment the computed optimal shaft speed is supplied to a controller capable of controlling the propeller shaft speed. Such a controller may be a simple PI controller or other controller already used for propeller speed control.

In an embodiment the optimum propeller speed comprises calculating a variation of a the propeller speed as a function of the inflow speed and combining the variation of the propeller speed with a reference propeller speed for obtaining the optimum propeller speed.

A second aspect of the invention relates to system for a vessel for increasing propulsion efficiency in waves by controlling a propeller shaft speed using a computed optimal propeller shaft speed, the vessel comprises a propeller driven by an engine and a controller for controlling the propeller shaft speed, the system comprises
observer for estimating a propeller inflow speed, the inflow speed comprising a speed component of wave induced inflow speed caused by waves passing the propeller,
computing means for computing the optimal propeller shaft speed as a function of the propeller inflow speed, where computing the optimal propeller shaft speed is based on maximising a propulsion efficiency.

It is understood that the computing means, the observer and the controller may be one or more computers configured for carrying out instructions for controlling, for estimating the propeller inflow speed and for computing the optimal propeller shaft speed. The instructions may be implemented as software, i.e. a computer program product, in a single computer or in a plurality of computers. Thus, each of the computing means, the observer and the controller may represent a single computer configured to execute computer program instructions for controlling, estimating and computing the optimal propeller shaft speed. Alternatively, one or more of the computing means, the observer and the controller may be hardware implemented on a printed circuit board or firmware implemented in a programmable computer chip, where the hardware or programmable chip is designed or programmed to perform controlling, estimating and/or computing the shaft speed.

A third aspect relates to a vessel comprising the system according to the second aspect.

A forth aspect relates to a computer program enabling a processor to carry out the method of the first aspect. The computer program product may adapted to enable a computer system comprising at least one computer having data storage means and data processing means associated therewith to carry out operations for controlling the propeller speed, estimating the propeller inflow, computing the optimal propeller shaft speed and possible other actions required for carrying out a method according to an embodiment of the invention.

The first, second, third and fourth aspect of the present invention may each be combined with any of the other aspects. These and other aspects of the invention will be apparent from and elucidated with reference to the embodiments described hereinafter.

BRIEF DESCRIPTION OF DRAWINGS

The present invention will now be explained, by way of example only, with reference to the accompanying Figures, where FIG. 11 shows the average values of the total and propeller efficiency.

DESCRIPTION OF AN EMBODIMENT

Figure 1:
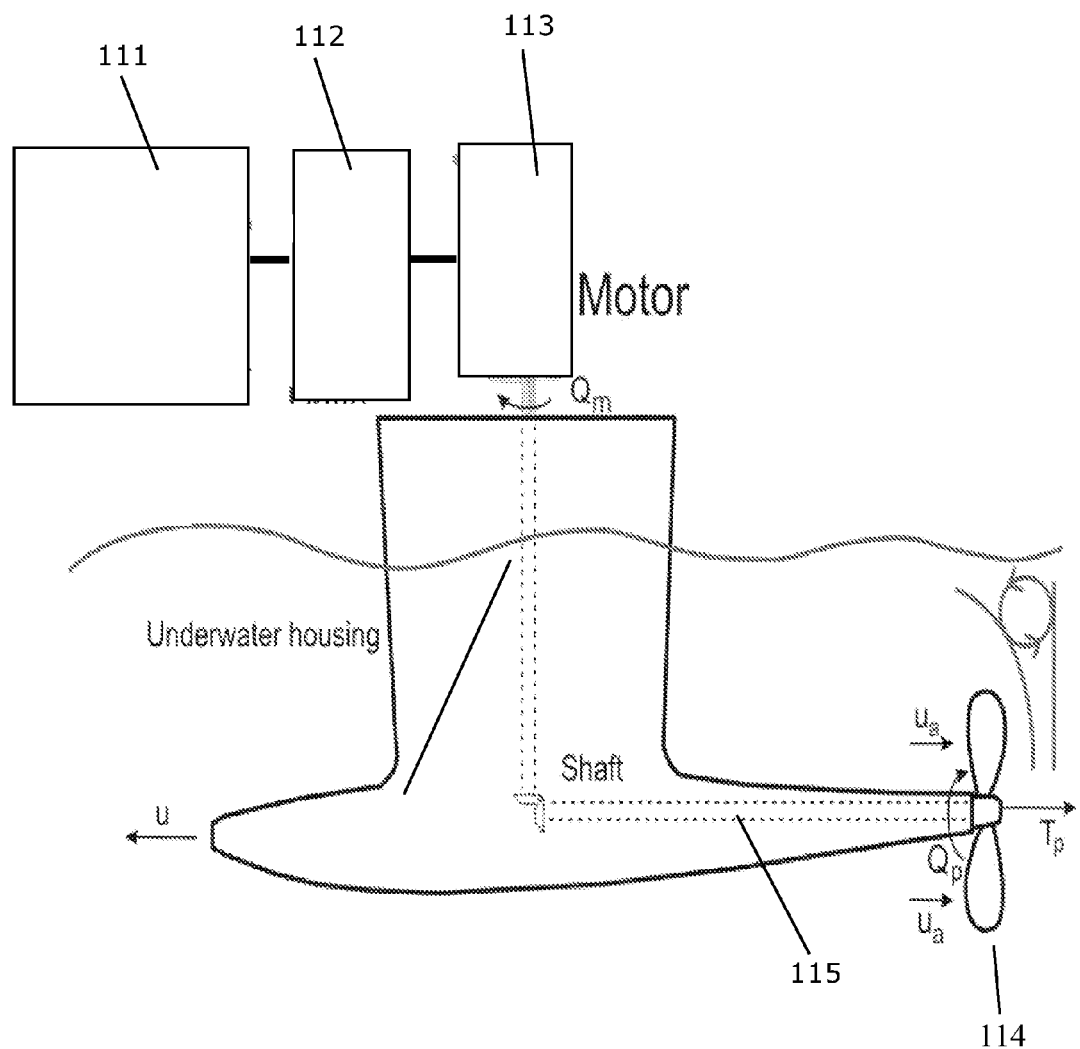
FIG. 1 shows a setup for experimental tests of propeller control.

In summary this invention relates to an efficiency optimizing propeller speed control for ships in moderate seas.

Subjects of the invention relates to ship propulsion, fuel economy, shaft speed control and optimal control.

Ships in moderate sea experience time-varying thrust and torque load on the shaft of their prime mover. The reason is the varying inflow velocity to the propeller during the passage of a wave. This variation has been considered a nuisance to the main engine control where the induced fluctuations in torque, shaft speed and power have been suppressed by some control schemes and ignored in others. Embodiments of this invention show how the fluctuation in inflow velocity can be utilized to increase the average efficiency of propulsion in waves without reducing the vessel speed. A nonlinear controller is proposed that is shown to theoretically enhance the propulsion efficiency. Model tests determine dynamic characteristics of propellers in waves and a simulation is employed to validate the novel control scheme.

For ships on passage, waves create load fluctuations in the shaft of the prime mover due to variations in inflow velocity to the propeller when waves pass by. When a propeller rotates at constant speed, variations in inflow velocity gives rise to variations of the advance number for the propeller and hence in propeller efficiency, as known from the propeller open-water characteristics. The topic of this description is to determine whether periodic variation in inflow velocity could be utilized actively to obtain higher average propulsion efficiency with respect to the use of conventional propeller controllers.

An embodiment of this invention will scrutinize the properties of propellers subjected to periodic wave induced velocity. A quasi steady-state model of a propeller with varying inflow is revisited and a proposition is made about possible enhancements in the overall propulsion efficiency in waves. Experimental results from model tests are analyzed and are used to show that quasi-steady state model assumptions are valid for a propeller in moderate sea. Subsequently, the efficiency maximization under periodic wave induced velocity is formulated as a nonlinear optimization problem and a numerical solution is presented. The results are discussed in view of impact on fuel economy and in view of feasibility of implementation. A simulation study is performed in order to demonstrate the properties of the efficiency optimizing controller.

Quasi Steady-State Propulsion Model

Tab. 1 provides a list of most used symbols in the equations below.

We consider a propeller attached to a shaft that rotates at the angular speed n. The shaft dynamics can be written as:

$$I\dot{n}=Q_m-(Q_p+Q_f),\qquad\text{eq. 1}$$

and $Q=Q_p+Q_f$ is the load at the main shaft. When performing operation at positive shaft and advance speeds, the propeller thrust and torque are usually expressed as (see "Carlton, J. S. (1994). Marine Propellers and Propulsion. Oxford, U.K.: Butterworth-Heinemann Ltd" which is hereby incorporated by reference)

$$T_p = K_T\frac{\rho n^2 D^4}{4\pi^2}, Q_p = K_Q\frac{\rho n^2 D^5}{4\pi^2}.\qquad\text{eq. 2}$$

$K_T$ and $K_Q$ are usually plotted over the advance number $J=2\pi u_a/(nD)$. Lift theory results in bilinear thrust and torque relations for the propeller, [see "Blanke, Mogens, Karl-Petter Lindegaard and Thor I. Fossen (2000). Dynamic model for thrust generation of marine propellers. In: Proc. IFAC Conference MCMC'2000 (M. Blanke, Z. Vukiz and M. Poursanjani, Eds.). IFAC." which is hereby incorporated by reference]:

$$T_p=t_{nn}n^2+t_{nu}nu_a,\qquad\text{eq. 3}$$

$$Q_p=q_{nn}n^2+q_{nu}nu_a,\qquad\text{eq. 4}$$

where $t_{nn}$, $t_{nu}$, $q_{nn}$ and $q_{nu}$ are constant parameters. The advance speed $u_a$, i.e. the inflow to the propeller, can be written as the sum of the nominal advance speed $U_a$ and the term $u_w$, representing wave induced inflow:

$$u_a=U_a+u_w.\qquad\text{eq. 5}$$

The nominal advance speed $U_a$ is related to the vessel speed u as $U_a=(1-w_f)u$, where the term $(1-w_f)$ is the wake fraction (see "Lewis, E. V. (1988). Principles of Naval Architecture Vol II: Resistance, Propulsion and Vibration. 3rd ed. Society of Naval Architects and Marine Engineers. New York" which is hereby incorporated by reference), usually identified from experiments performed in a towing tank. This representation will be validated by model experiments in a subsequent section. It is known that waves are caused by elliptical motion of water in the upper sea level, i.e. the motion of an imaginary water particle will be elliptical. Thus, the wave induced water speed $u_w$ is the water speed caused by the elliptical motion of water particles.

Figure 8:
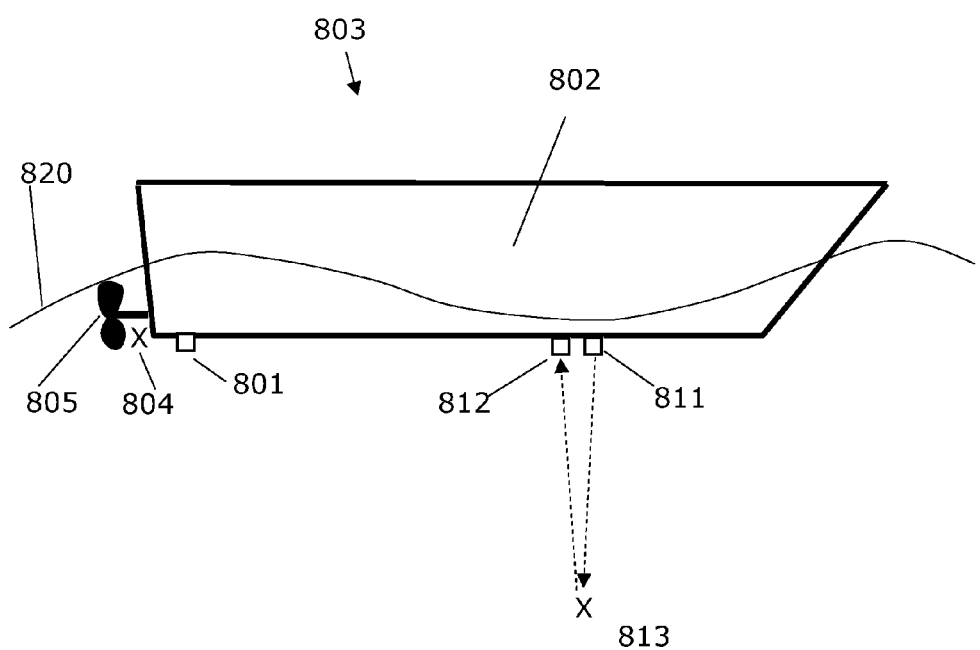

The advance speed $u_a$ may in principle be measured using a velocimeter (LDV) or other device set up to measure the water flow in front of the propeller. FIG. 8 shows a Laser Doppler Anemometer 801 mounted to the hull 802 of a ship 803. The Laser Doppler Anemometer may be set up to measure an average of the water speed flowing through a region 804 in front of the propeller 805. Since the water speed close to the surface of the sea fluctuates too much to be useful in traditional propeller control, other measures of the ship speed relative to sea are traditionally used. For example, the ship speed may be measured relative to the water deep below the ship as shown in FIG. 8, where an ultrasonic transmitter 811 and receiver 812 are arranged to measure the ship speed relative to the water at a point 813 deep below the surface 820 of the sea where the water motion is negligible.

An important measure of the propeller performance is the open-water efficiency, which is defined as the ratio of the produced and the consumed power by the propeller. The propeller efficiency is computed as $$\eta_p = \frac{u_a T_p}{n Q_p} = \frac{u_a K_T}{nDK_Q} = \frac{JK_T}{2\pi K_Q}. \qquad \text{eq. 6}$$

The balance between the propeller thrust and vessel hull resistance R(u) determines the surge velocity through $$m\dot{u}=R(u)+(1-t_d)T_p, \qquad \text{eq. 7}$$

where $(1-t_d)$ is the thrust deduction.

To analyze the total propulsion efficiency, we introduce the total efficiency $$\eta = \frac{(1-t_d)T_p u}{Qn}. \qquad \text{eq. 8}$$

Using eq. 4 and eq. 3, $$\eta = \frac{(1-t_d)(t_{nn}n^2 + t_{nu}nu_a)u}{(q_{nn}n^2 + q_{nu}nu_a + Q_f)n}. \qquad \text{eq. 9}$$

The dynamic properties of the propeller inflow related to the shaft speed, thrust and torque have been scrutinized in recent years caused by the widespread use and importance of thrusters in the control of offshore platforms and vessels. A nonlinear observer design for inflow velocity estimation was proposed in "Fossen, Thor I. and M. Blanke (2000). Nonlinear output feedback control of underwater vehicle propellers using feedback from estimated axial flow velocity. IEEE Journal of Oceanic Engineering, 25(2), 241-255" which discloses compensation of thrust losses due to variations in magnitude of the propeller axial flow velocity (ambient water velocity) by use of a propeller shaft speed controller with feedback from the estimated axial flow velocity in the propeller disc. Accordingly, the control objective is to design a propeller shaft speed controller tracking the desired propeller thrust by compensating for axial flow velocity. However, the disclosure does not consider reducing fuel consumption by vessel engines.

Periodic Wave Disturbance

Without loss of generality, the wave induced velocity in eq. 5 can be assumed to be periodic, $$u_w(t+\tau_w)=u_w(t). \qquad \text{eq. 10}$$

In regular waves, the wave induced velocity can be approximate with $$u_w(t) = u_{wo}\sin\left(\frac{2\pi}{\tau_w}t\right).$$

Neglecting the shaft moment of inertia, the mechanical (engine) power consumed during one cycle of the wave induced velocity period is $$P_m = E\{Qn\} = \frac{1}{\tau_w}\int_0^{\tau_w} Q(t)n(t)\,dt. \qquad \text{eq. 11}$$

At the same time, the power delivered to propel the ship is $$P_p = E\{R(u)u\} = \frac{1-t_d}{\tau_w}\int_0^{\tau_w} T_p(t)u(t)\,dt. \qquad \text{eq. 12}$$

The average propulsion efficiency is $$\begin{aligned}\bar{\eta} &= \frac{1}{\tau_w}\int_0^{\tau_w} \frac{P_p}{P_m}\,dt \\ &= \frac{1-t_d}{\tau_w}\int_0^{\tau_w} \frac{T_p(t)u(t)}{Q(t)n(t)}\,dt.\end{aligned} \qquad \text{eq. 13}$$

Propeller in Waves

Experiments for the study of the propeller behaviour in moderate waves are performed at the MCLab, an experimental laboratory located at NTNU in Trondheim. The basin is equipped with a 6DOF towing carriage that can reach a maximum speed of 2 m/s and with a wave generator able to generate waves up to 30 cm. In order to avoid losses due to ventilation, the nominal propeller submergence h/R is set equal to 2.68, where R is the propeller radius. The tests are performed on a four bladed propeller with a diameter of 25 cm. A sketch of the setup is shown in FIG. 1.

FIG. 1 shows a computer 111 which supplies a control signal to a drive 112, i.e. a power drive which provides power to an electric motor 113 which supplies a motor torque Qm to the propeller 114 via a shaft 115. It is understood that a combustion engine may equally be used instead of the drive 112 and the electric motor 113. The propeller geometrical parameters are given in Tab. 2.

Figure 2A:
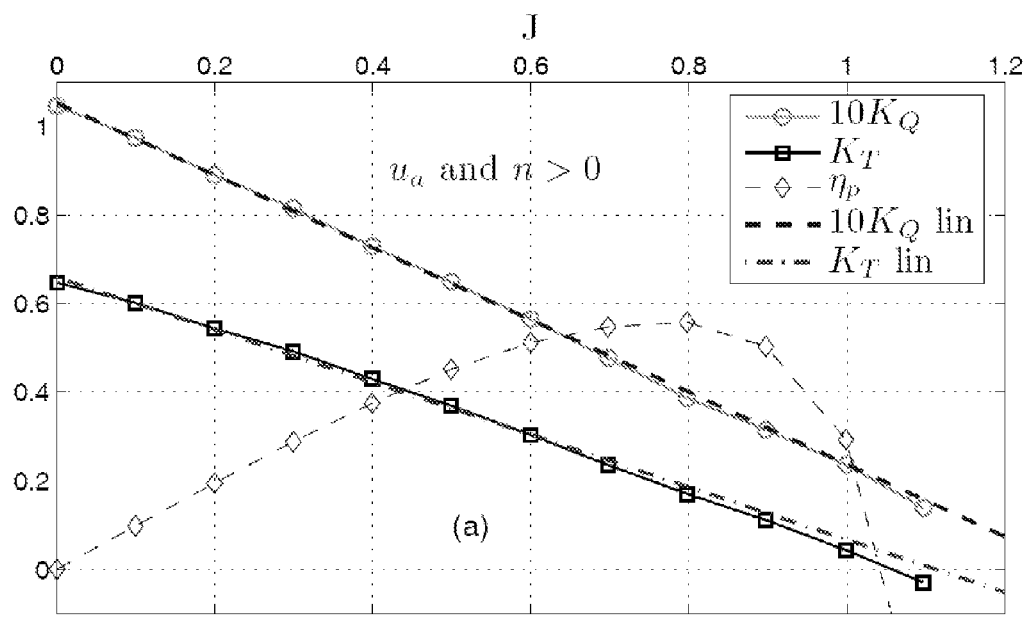
FIG. 2a shows measured open-water propeller characteristics, their linear approximations and the propeller efficiency.
Figure 2B:
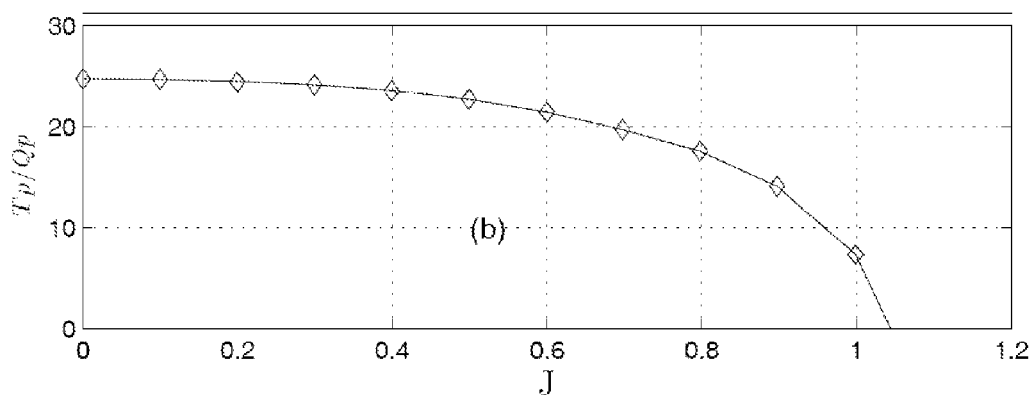
FIG. 2b shows the ratio of the propeller thrust and the propeller torque.

The measured standard open-water propeller characteristics $K_T$ and $K_Q$, their linear approximations and the propeller efficiency $\eta_p$ are depicted in FIG. 2a, as a function of the advance number J. The obtained propeller efficiency $\eta_p$ is determined from eq. 6 and, therefore, gives the ratio of the power generated by the propeller and the power supplied to the propeller. The linear approximations of $K_T$ and $K_Q$ may be determined from equations 2, 3 and 4. Accordingly, the propeller efficiency $\eta_p$ may also be approximated from equations 2, 3, 4 and 6, e.g. using the approximations of $K_T$ and $K_Q$ in FIG. 2a. FIG. 2b shows the ratio of the propeller thrust Tp and the propeller torque Qp.

In operation, the efficiency curve $\eta_p$ in FIG. 2a shows how propeller efficiency will vary with variation in advance number J=2πu$_a$/(nD). Consequently, when the advance speed ua increases or decreases, e.g. due to waves, the propeller efficiency $\eta_p$ will vary. From FIG. 2a it may appear that the propeller should be operated at the peak of the efficiency curve. However, for various reasons steady state operation can not be at the peak of the efficiency curve.

Figure 2C:
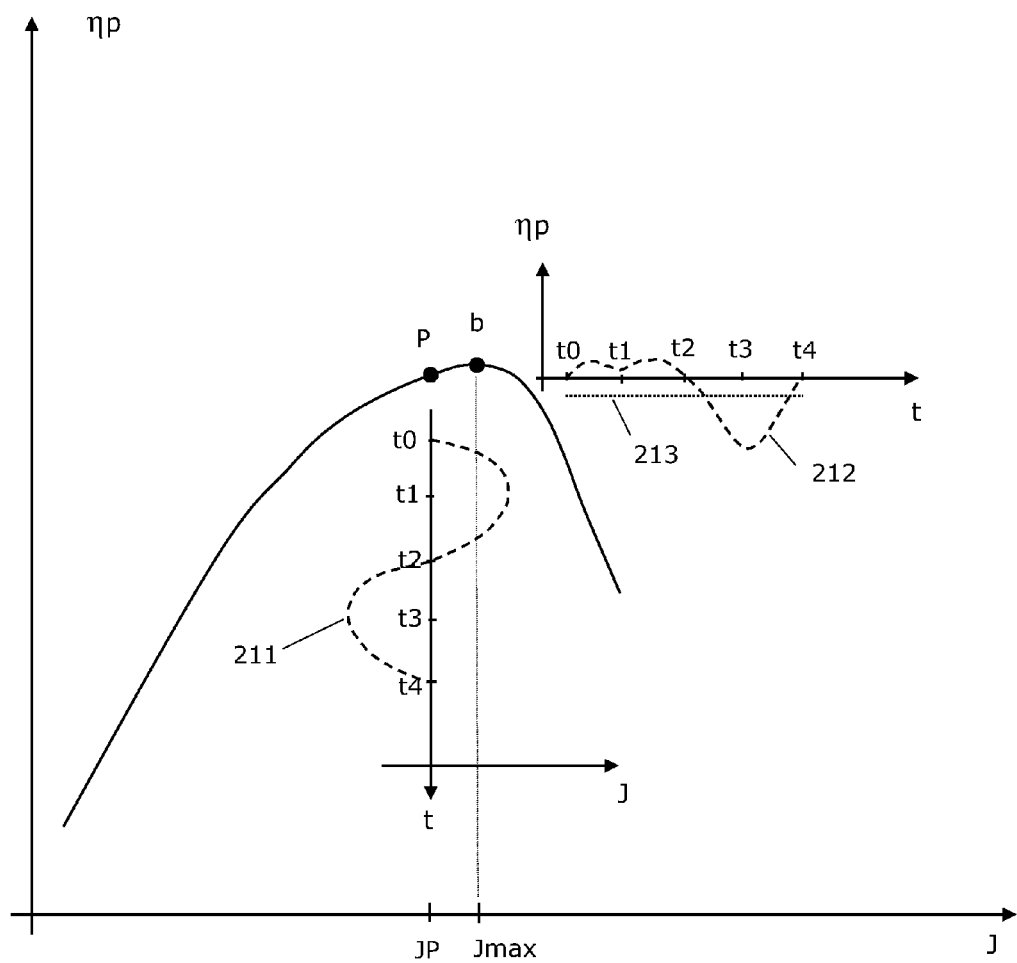
FIG. 2c shows a principal sketch of the propeller efficiency curve for explanation of the invention.

FIG. 2C shows a principal sketch of the efficiency curve $\eta_p$ from FIG. 2a depicted as a function of the advance number J. The point P represents a working point at which it is desirable to operate the propeller. When the advance number J decreases below the advance number JP the efficiency $\eta_p$ decreases. When the advance number J increases above JP the efficiency increases but at a lower rate as compared to the situation where the advance number J decreases below JP. When the advance number J increases beyond advance number JMAX the efficiency starts decreasing again. The curve 211 shows variations in the advance number J to the propeller as a function of time t, which variations are caused only due to changes in wave induced inflow to the propeller, i.e. the propeller speed n and the nominal advance speed Ua are kept constant. The average value of J of the curve 211 is Jp, the value at steady state operation when there is no variation in inflow velocity. By projecting the sinusoidal variations 211 of the advance number J onto the efficiency curve and plotting the resulting efficiency numbers along the period of time, t0-t4, the efficiency curve 212 is obtained for propeller efficiency $\eta_p$.

The average value of the propeller efficiency 212 taken over the period from t0 to t4, which is illustrated by curve 313, is less than the efficiency $\eta_p$ at the working point P since the average slope of the efficiency curve $\eta_p$ lower above JP than below JP. Accordingly, in the situation where the propeller operates at constant speed n and the nominal advance speed Ua is constant, waves causes a decrease of the average propeller efficiency $\eta_p$.

Accordingly, by introducing a variation of the propeller speed $\Delta n$ to the propeller speed n, e.g. by adding the variation $\Delta n$ to n, and adjusting the variation $\Delta n$ so that the propeller is always operated at working point P, irrespective of variations in the advance speed ua or the wave induced inflow uw, the average propeller efficiency $\eta_p$ increased as compared to the situation where n is kept constant or otherwise controlled in a non-optimum way.

Figure 2D:
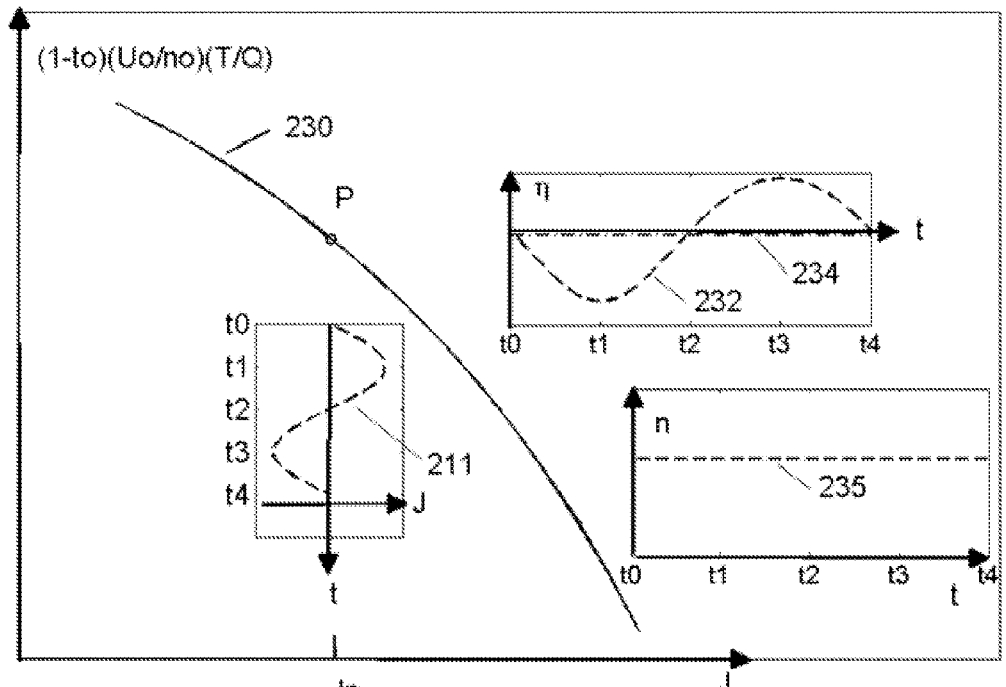
FIG. 2d shows a principal sketch of the propulsion efficiency curve when inflow velocity has a periodic variation and shaft speed is kept constant, for explanation of the invention.

FIG. 2d shows a plot of the ratio between thrust and torque depicted as a function of the advance number J, and scaled such that at the point of steady operation, shown as point P in the FIG. 2d, the value of the curve equals the propulsion efficiency given by eq. 8. The scaling factor includes the wake factor (1−t0), the average vessel velocity U0, and the average propeller speed n0. The curve 211 shows variations in the advance number J to the propeller as a function of time t, which variations are caused only due to changes in wave induced inflow to the propeller, i.e. the propeller speed n and the nominal advance speed Ua are kept constant. The variation in J has zero mean, whereas the mean of J is equal to Jp. By projecting the sinusoidal variations 211 of the advance number J onto the efficiency curve 230 and plotting the resulting efficiency numbers along the period of time, t0-t4, the efficiency curve 232 is obtained for propulsion efficiency $\eta$. The shaft speed n is kept constant as shown in as the curve 235 in FIG. 2d.

The mean value of $\eta$ (232) is shown as 234 in FIG. 2d from which it is seen that also propulsion efficiency decreases when a zero mean variation occurs in inflow velocity.

Figure 2E:
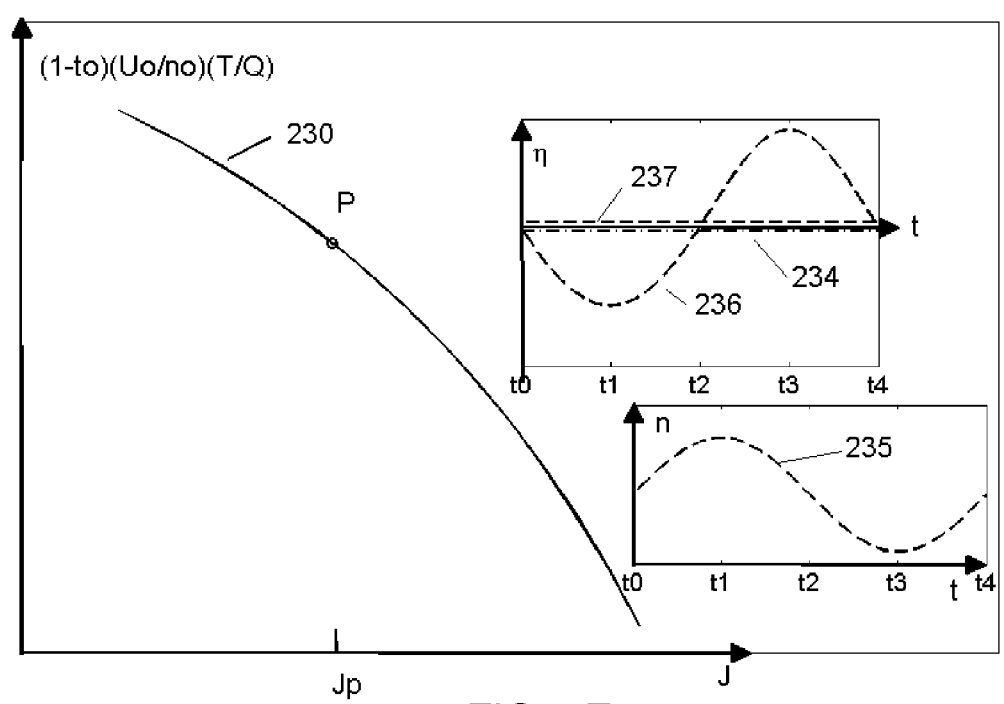
FIG. 2e shows a principal sketch of the propulsion efficiency curve when inflow velocity has a periodic variation and shaft speed is controlled as a function of inflow velocity, for explanation of the invention.

FIG. 2e repeats the plot from FIG. 2.d of the ratio between thrust and torque depicted as a function of the advance number J, scaled such that at the point of steady operation, shown as point P in the FIG. 2e, the value of the curve equals the propulsion efficiency given by eq. 8. When varying the inflow velocity as in FIG. 2d, but now controlling the propeller shaft speed, n, in proportion to the inflow velocity, shown as 235 in FIG. 2e, the propulsion efficiency $\eta$ has the form shown as 236 in the figure. The mean value of $\eta$ in 235 is shown as 237. The mean value is seen to increase both above the value for undisturbed operation (point P) and above curve 234. The reason for the increase is that n is varied in a way such that the ratio of ship speed to propeller shaft speed (u/n) is varied such when the ratio of shaft thrust over propeller torque (T/Q) varies, the product of the two ratios (u.T/Q.n) will get a higher value.

As a simple analogy one can think of the product of two sinusoidal signals. The product can achieve a positive mean value with proper phase between the two signals. The case of the propeller efficiency is more complicated than this analogy since nonlinear functions are to be considered. This intuitive explanation and the illustration showed that it is indeed possible to enhance propulsion efficiency by controlling shaft speed as a function of inflow velocity fluctuation.

While the above explanation provides an intuitive way of determining changes in the propeller speed, n, an exact method for determining the variation $\Delta n$, which will optimize the propulsion efficiency, given a time varying advance speed ua, is described below.

In order to simulate a real scenario, the towing carriage is moved according to the measured thrust produced by the propeller and the vessel dynamics according to eq. 7. The hull resistance R(u) includes a linear and quadratic term:

$$R(u) = -d_l u - d_q u|u|. \qquad \text{eq. 14}$$

The vessel dynamics is simulated with m=200 kg, $d_l$=30 and $d_q$=20. The measured propeller thrust is fed into the model given by eq. 7 and the resulting vehicle speed is used as a reference for the towing carriage velocity. In our setup, the nominal advance speed $U_a$ is considered equal to towing carriage speed since the propeller housing does not create a significant wake. For the same reason, the thrust deduction number $t_d$ can be neglected.

Figure 3:
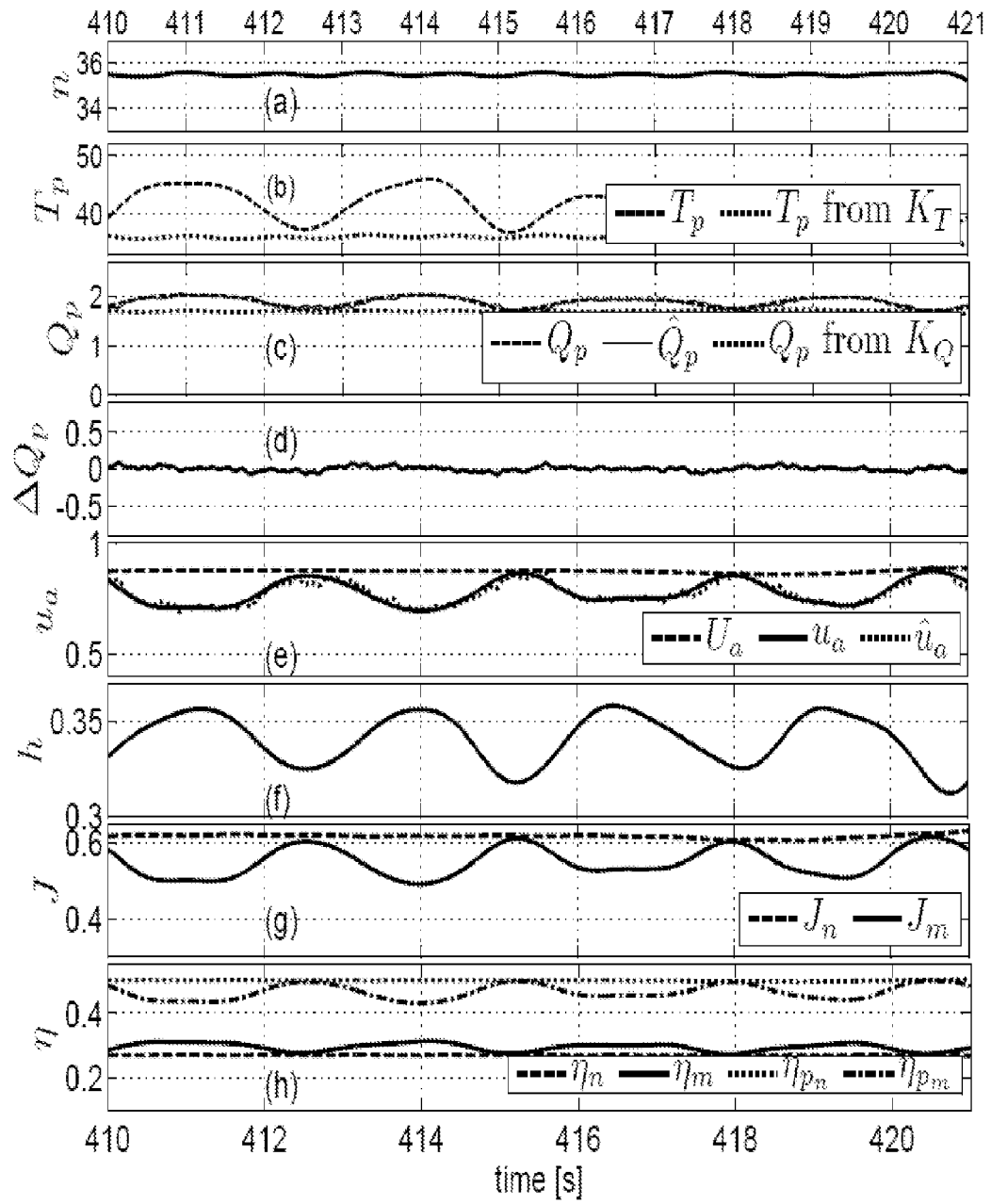
FIG. 3 shows data from a test performed at constant shaft speed.

FIG. 3 presents data relative to a test performed at constant shaft speed n in regular waves of 4 cm peak-to-peak amplitude and 1.75 s period. The waves propagate in the same direction of the vessel speed (following sea). The measurements of thrust, torque, shaft speed and nominal advance speed have been filtered before plotting. The shaft speed is depicted in FIG. 3a. The measured propeller thrust is plotted in FIG. 3b. The same plot presents also the thrust computed with eq. 3, where J is derived using the nominal value of the advance speed $U_a$, the best guess we have of the actual advance speed. We can notice that the thrust computed from the propeller characteristics does not reproduce accurately the measurements, suggesting that $U_a$ is not a good measure of the actual advance speed. This explains also the discrepancy between the measured propeller torque and the one computed from the propeller characteristics, shown in FIG. 3c.

FIG. 3e shows the nominal value of the advance speed and the actual one, computed by $$u_a = \frac{Q_p - q_{nn} n^2}{q_{nu} n}, \qquad \text{eq. 15}$$

employing the torque measurement. Since this value is not usually available in a real vessel, an estimate $\hat{Q}_p$ is obtained employing the nonlinear observer presented in "Pivano, L., Ø. N. Smogeli, T. A. Johansen and T. I. Fossen (2006). Experimental Validation of a Marine Propeller Thrust Estimation Scheme. 7th IFAC Conference on Manoeuvring and Control of Marine Craft, Lisbon" which is hereby incorporated by reference.

Pivano, L. et al, 2006, discloses the following method for deriving an estimate of the propeller torque, $\hat{Q}_p$. To derive a stable observer for the propeller torque the following system is considered:

$$J_m \dot{\omega} = Q_m - Q_p - Q_f(\omega) + \Delta_f \qquad \text{eq. A1}$$

$$\dot{Q}_p = -\frac{1}{\tau_q} Q_p + w_q$$

where $\omega$ is the angular speed of the propeller shaft and the propeller torque Qp is treated as a timevarying parameter and modelled as a first order process with positive time constant $\tau_q$ and driven by a bounded random noise $w_q$. In eq. A1 a friction modelling error and measurement error on Qm are accounted for by Δf. The following observer with gains L1 and L2 was proposed:

$$J_m \dot{\hat{\omega}} = Q_m - \hat{Q}_p - Q_f(\hat{\omega}) + L_1(y - \hat{y}) \quad \text{eq. A2}$$

$$\dot{\hat{Q}}_p = -\frac{1}{\tau_q} \hat{Q}_p + L_2(y - \hat{y})$$

The measurement $$y = \omega + v \quad \text{eq. A3}$$

is assumed to be corrupted by an error v. Assuming that Δf, v and $w_q$ are bounded, the linear part of friction is $Q_f(\omega) = k_{f2}\omega$ and nonlinear elements of the friction are bounded, then with choice of gains $L_1$, $L_2$ that satisfy $$L_1 > -k_{f2} \quad \text{eq. A4}$$

$$|1 + J_m L_2| < 2\sqrt{\frac{J_m}{\tau_m}(k_{f2} + L_1)}$$

Then a stable estimate of the propeller torque, $\hat{Q}_p$, can be determined from eq. A2.

The estimate of $\hat{Q}_p$ reproduces well the measurement and it can be used to derive $\hat{u}_a$, an estimate of the advance speed, through eq. 15. The estimate $\hat{u}_a$ is shown in FIG. 3e. It is interesting to note the correlation between the advance speed $u_a$ and the propeller submergence h, plotted in FIG. 3f. The magnitude of the advance speed is larger when the propeller is closer to the water surface. This is due to the horizontal water speed induced by the waves that, according to the classical wave theory, is greater close to the surface.

FIG. 3g shows $J_n$ and $J_m$, the nominal and the measured value of the advance number J respectively. $J_n$ is obtained using $U_a$ instead of the actual advance speed $u_a$, used to compute $J_m$. FIG. 3h shows the nominal and measured propeller efficiency $\eta_{p_n}$ and $\eta_{p_m}$, and the nominal and measured total efficiency $\eta_n$ and $\eta_m$. The total efficiency is smaller than the propeller efficiency since it accounts for the shaft friction torque, quite significant in our system. The propeller efficiency is computed from the corresponding value of J combined with the efficiency curve in FIG. 2a. The total nominal efficiency $\eta_n$ is computed with eq. 9 using $U_a$ while $\eta_m$ has been computed with the actual value of $u_a$. It is important to notice the opposite behaviors of $\eta_m$ and $\eta_{p_m}$ with respect to the advance speed. When $u_a$ decreases, since the shaft speed is constant, J decreases producing a reduction of the propeller efficiency. At the same time the thrust torque ratio increases due to the reduction of the value of J, as shown in FIG. 2b. This lead to an increase of the total efficiency given by eq. 8 since the vessel speed does not change considerably. For increasing value of $u_a$, the opposite behaviour is observed.

Efficiency Optimization

The oscillations experienced in the total efficiency may be exploited in order to reduce the power consumption without reducing the vessel speed as disclosed below.

Problem 1. The optimal control problem can be formulated as $$\max_{n(t)} \bar{\eta} = \max_{n(t)} \frac{1 - t_d}{T} \int_0^T \frac{T_p(t)u(t)}{Q(t)n(t)} dt, \quad \text{eq. 16}$$

with $t \subset [0, T]$ where $T = k\tau_w$, k being an integer subject to $$\frac{1}{T} \int_0^T T_p(\tau) d\tau = T_0, \quad \text{eq. 17}$$

$$|T_p(t) - T_0| \leq T_M. \quad \text{eq. 18}$$

The first constraint in eq. 17 is needed to maintain a constant average vessel speed. The second constraint in eq. 18 is used to limit the thrust oscillations in order to reduce wear of engine and other mechanical parts.

Thus, the integral in eq. 16 expresses the condition for determining the optimal propeller shaft speed nd as a function of the propeller inflow speed $u_a$ by maximising the propulsion efficiency. The propulsion efficiency may be given as the ratio of the average power delivered to propel the vessel and the average power consumed by the prime mover as stated by equation 16. However, the propulsion efficiency may also be determined as other power ratios, e.g. the ratio of the produced and the consumed power by the propeller as given in eq. 6.

Equation 16 is solved by deriving values of the propeller speed n which maximises the propulsion efficiency, i.e. the integral, for different values of advance speed ua. Equation 16 depends on advance speed ua in terms of propeller trust Tp and shaft load torque Q as seen from eq. 3 and eq. 4. Since eq. 16 may be too computationally heavy to solve in real time control of the propeller, an approximate solution to eq. 16 may be established by deriving a static mapping such as look-up table containing pairs of advance speed values ua and the corresponding required propeller speed values n. Alternatively, a function, e.g. a polynomial or a piecewise linear function may be fitted to advance speed values ua and propeller speed values n derived from eq. 17.

Numerical Solution of the Optimization Problem

A numerical solution of the optimization problem, defined as offline η optimizer controller, is computed in order to evaluate a possible increase of the total efficiency with respect to the employment of the conventional shaft speed and torque controller (see "Smogeli, Ø. N., E. Ruth and A. J. Sorensen (2005). Experimental validation of power and torque thruster control. Proceedings of the IEEE 13th Mediterranean Conference on Control and Automation (MED'05), Cyprus. pp. 1506-151" which is hereby incorporated by reference). Considering the vessel dynamics given by eq. 7, the average vessel speed is set equal to 0.86 m/s. The wave induced inflow velocity $u_w$ is a sinusoidal signal of 0.2 m/s amplitude and 3 s period. At this stage the shaft moment of inertia is neglected thus considering the propeller able to spin at the speed n instantaneously. The friction torque is modelled as a Coulomb plus a linear viscous term. The speed of the vessel is assumed to be available. With the same vessel dynamics parameters as the experiments, the average propeller thrust $T_0$ is equal to 45 N and the average shaft speed equal to 37.7 rad/s. The value of $T_M$ is chosen equal to ±7N in order to obtain thrust oscillations smaller than the ones obtained using the conventional shaft speed controller. The solution is computed in the Matlab environment by solving the problem in eq. 16 in three wave periods $\tau_w$ with the constraints given by equations 17 and 18 (see for example "Becerra, V. M. (2004).

Solving optimal control problems with state constraints using nonlinear programming and simulation tools. IEEE Transactions on Education 47(3), 377-384." which is hereby incorporated by reference).

Figure 5:
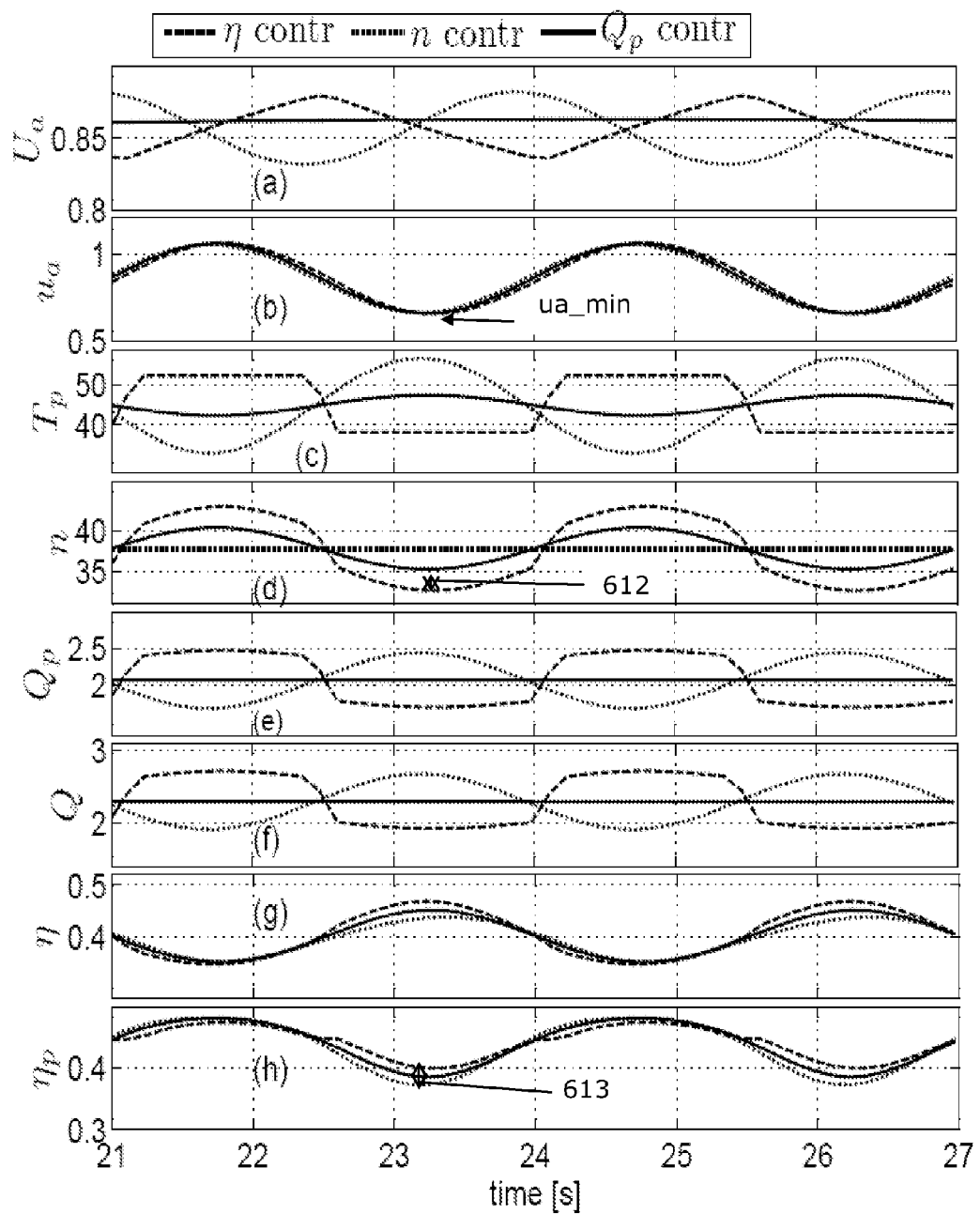
FIG. 5 shows a result of a simulation of three different controllers.

FIG. 5 shows the result of a simulation for the three cases of an optimizing controller according to an embodiment of this invention (denoted η contr), a conventional shaft speed controller (denoted n contr) and a torque controller (denoted $Q_p$ contr). The vessel speed, equal to the nominal advance speed in this case, is depicted in the subplot (a). The torque controller produces the least oscillatory vessel speed due to the smallest variations of the propeller thrust around its mean values, as shown in the subplot (c). The vessel speed obtained with the optimizing controller and conventional shaft speed controllers present approximately the same variation around the average. The shaft speed is shown in the subplot (d). The optimizing controller produces the larger shaft speed variation but the thrust shows smaller oscillations compared to the conventional shaft speed controller. The propeller and load torque are shown in the subplot (e) and (f) respectively. The total efficiency and the propeller efficiency are depicted in subplots (g) and (h). It is interesting to note that the shaft speed obtained as a solution of the optimizing problem presents the largest values when the propeller efficiency is larger and vice versa. The results in FIG. 5 could be interpreted in view of FIG. 2C. For example, consider the minimum advance speed ua_min in subplot (b) in FIG. 5. According to the graphs for propeller efficiency in FIG. 2A and FIG. 2C, and $J=2\pi u_a/(nD)$, the propeller speed n should be decreased for decreasing values of the advance speed ua so as to stay at the working point P at the efficiency curve $\eta_p$. Indeed, subplot (d) in FIG. 5 shows that the solution to eq. 16 results in a propeller speed n which is smaller than the propeller speed for the torque controller by an amount indicated by 612. The resulting propeller speed of the optimal controller results in a propeller efficiency $\eta_p$ which is greater than the efficiency of both the torque controller and the conventional shaft speed controller by amounts indicated by 613 in subplot (h) in FIG. 5.

The offline computation of the optimal solution furnishes good performance when the sea state does not change, i.e. the wave induced inflow preserves the same amplitude over time. As wave patter changes, a renewed optimization can be performed or a table of pre-computed functions can be stored for on-line use in the efficiency optimizing controller.

Alternatively, the optimal solution of the propeller speed may be adjusted, e.g. at predetermined intervals or when wave characteristics (e.g. amplitude spectrum of waves or wave direction) show a sufficient change. For example, different solutions of the optimal propeller shaft speed nd may be derived for different wave characteristics (i.e. for different frequencies and amplitudes of the advance speed ua) and the adjustment of the optimal solution of the propeller speed may be adapted to the optimal solution that offers the best match to the actual wave characteristics. Clearly, the adaptation of the optimal solution may be performed continuously or at intervals.

Figure 7:
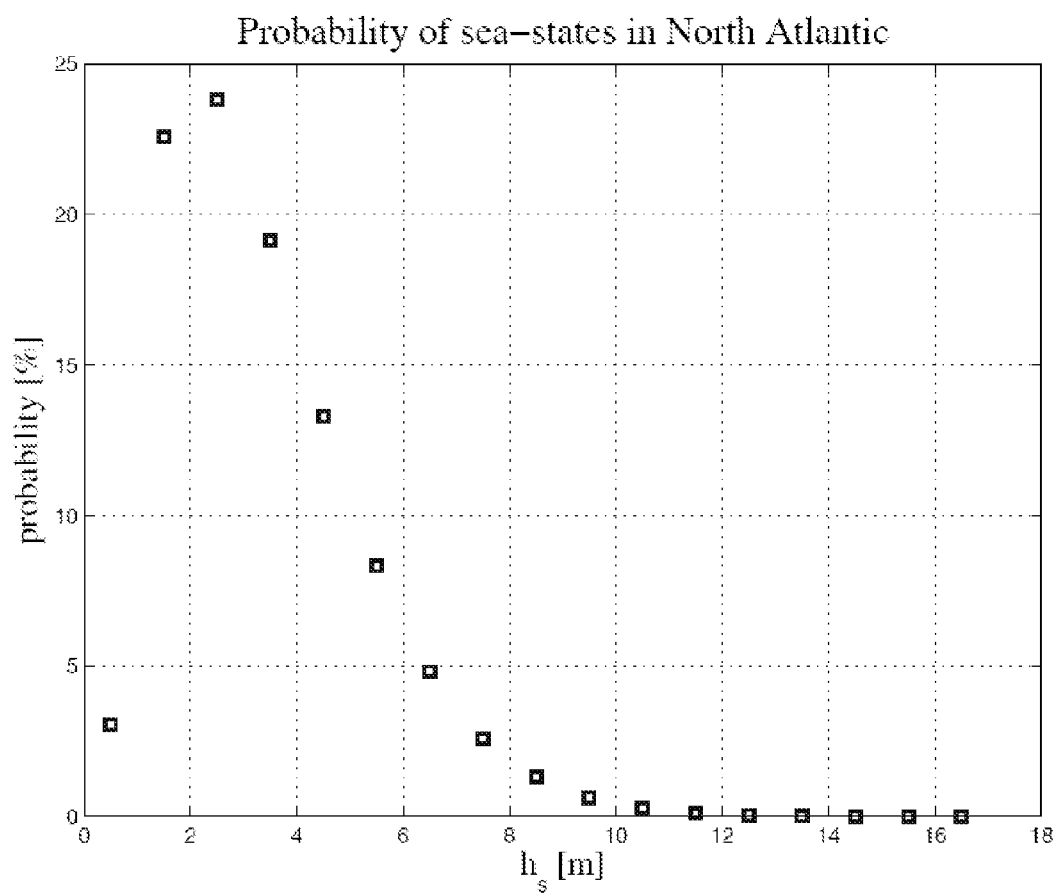
FIG. 7 shows a statistical distribution of wave amplitudes, FIG. 8 illustrated methods for measuring inflow speed and normal vessel speed, FIG. 9 provides a list of most symbols used in the equations below, FIG. 10 gives the propeller geometrical parameters.

Alternatively, the statistical distribution of wave amplitudes (see FIG. 7) and wave frequencies may be used to derive a statistical solution of the optimal solution of the propeller speed. This can be achieved by optimization of equation 16 subject to constraints eq. 17 and eq. 18. The result is an optimal shaft speed demand, which is a function of fluctuation in advance speed, $\Delta n = f_{opt}(\Delta u_a)$.

For a practical implementation, a static mapping is identified from the advance speed $u_a$ to the shaft speed n. Defining the variations of $u_a$ and n around their average values with $\Delta u_a$ and $\Delta n$, we have $$\Delta n = f_{opt}(\Delta u_a). \qquad \text{eq. 19}$$

Accordingly, the optimal solution of the propeller speed may be presented as a static mapping $f_{opt}$. In an embodiment, the static mapping function $f_{opt}$ is determined from a numerical solution of the optimization problem given by equation 16, possibly in combination with the constraints given by equation 17 and 18 or other constraints. Alternatively, instead of mapping variations of the advance speed to propeller speed variations, the static mapping may directly map actual values of the advance speed to propeller speed values.

As explained above, different optimal solutions $f_{opt}$ may be determined for different wave characteristics. Accordingly, a set of mapping functions f1, f2, fn, may be derived for n different wave characteristics, so that the adaptation of the optimal solution to the actual wave characteristics, implies selecting the mapping function that offers the best match to the actual wave characteristics.

Figure 6:
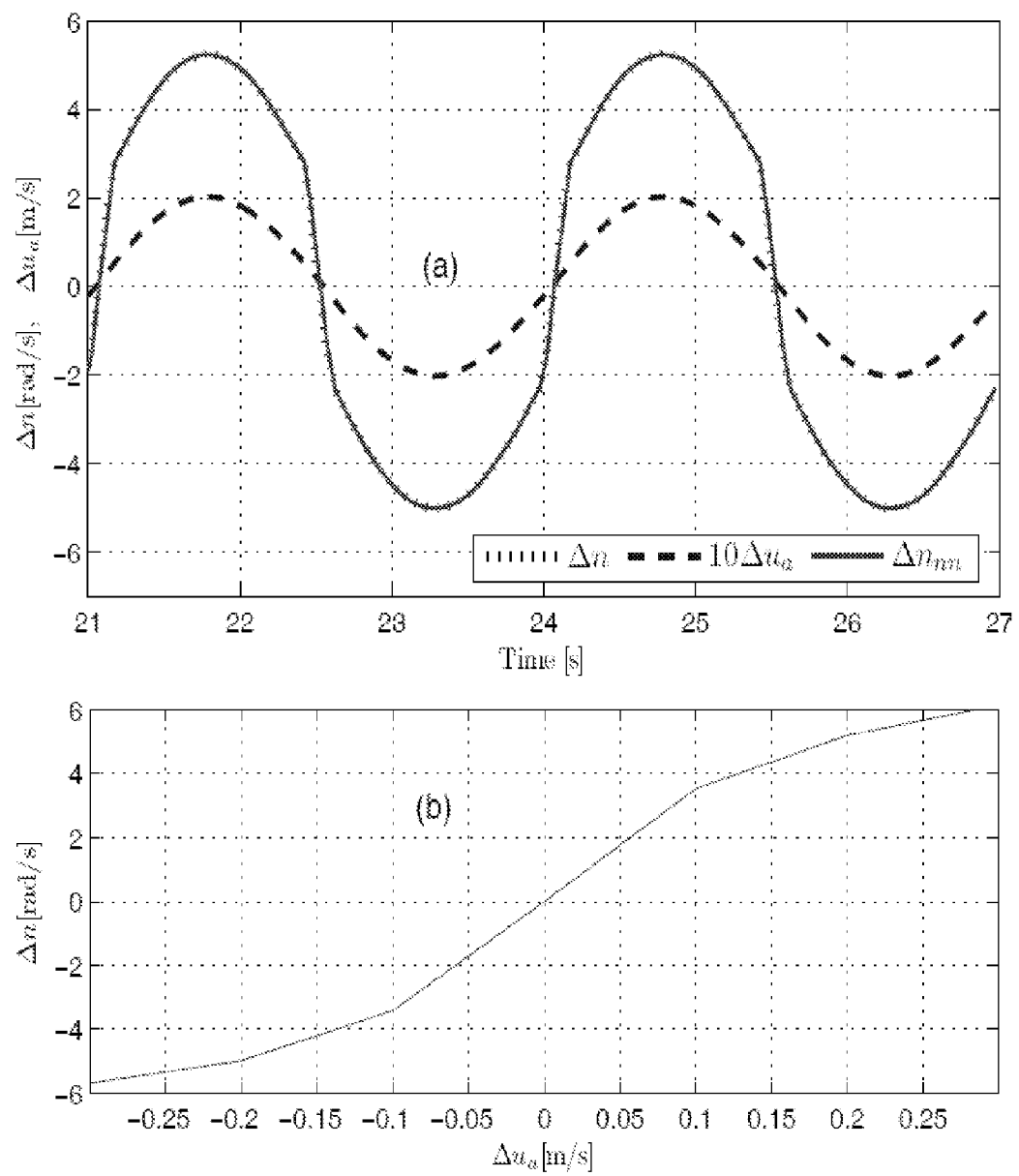
FIG. 6a shows a result of inflow speed and optimal propeller speed.
FIG. 6b shows a static mapping function.

The average value of n corresponds to the shaft speed reference required from the conventional shaft speed controller. By adding $\Delta n$ to the reference shaft speed we obtain the optimal solution. The value of $\Delta n$ is computed from eq. 19 where $\Delta u_a$ is obtained from an estimate of $u_a$ by subtracting its average values (computed using a low pass filter for example). FIG. 6b shows the static mapping $f_{opt}$ identified as a series of tansig functions (see "Narendra, K. S. and K. Parthasarathy (1990). Identification and control of dynamical systems using neural networks. IEEE Transactions on Neural Networks 1(1), 4-27." which is hereby incorporated by reference). FIG. 6a shows $\Delta u_a$, $\Delta n$ and its approximation $\Delta n_{nn}$ obtained with eq. 19.

Figure 4:
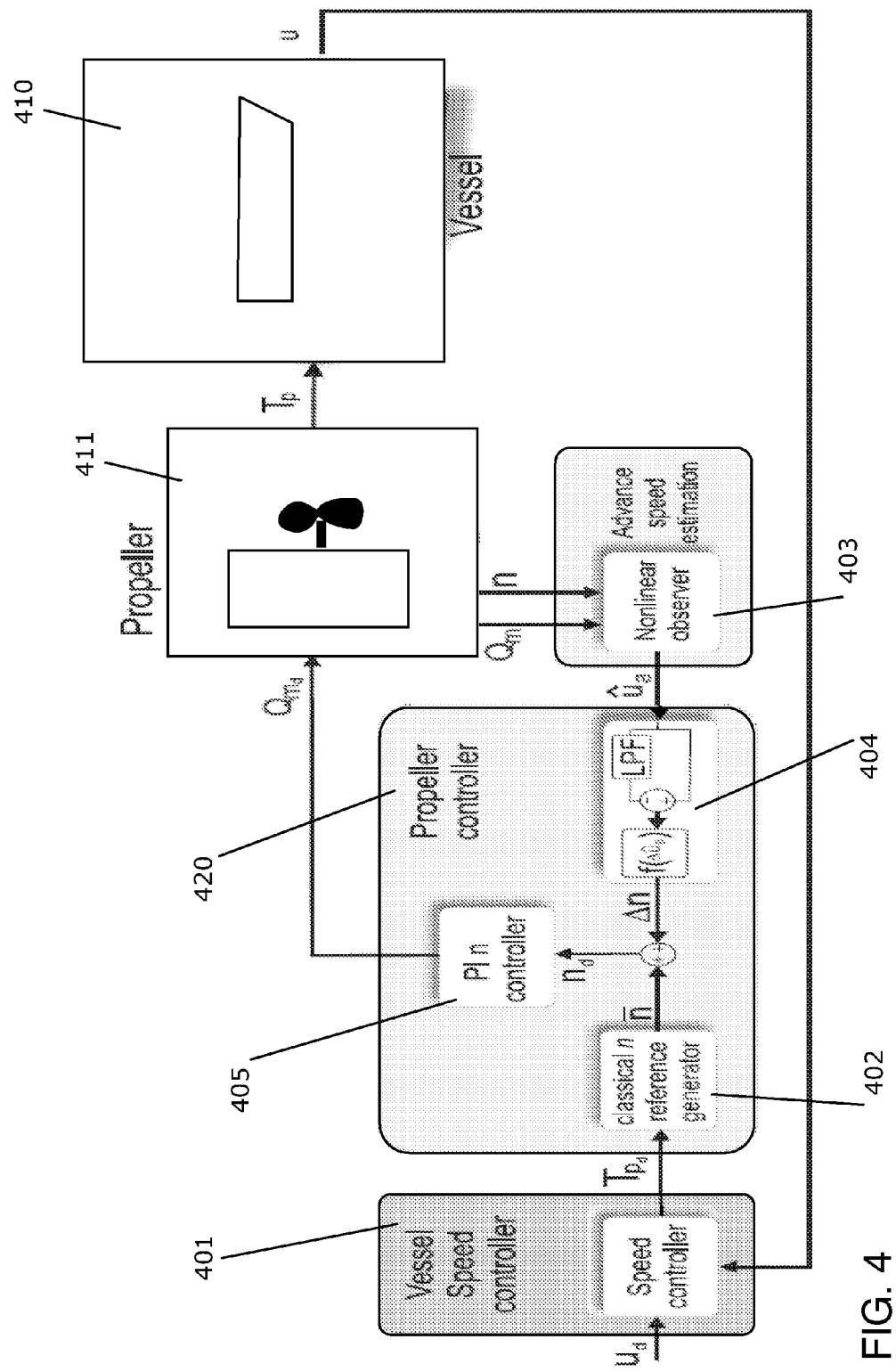
FIG. 4 shows the controller block diagram.

FIG. 4 shows the controller block diagram. The propeller and the engine are integrated in to the engine unit 411. The speed controller 401 is provided with the desired vessel speed ud and the measured vessel speed u from the vessel 410, from which input the controller 401 generates a value of the desired propeller thrust Tpd. The desired propeller thrust Tpd is supplied to the conventional shaft speed controller 402 which generates the reference propeller speed $\bar{n}$ necessary for obtaining a vessel speed u which approaches or equals ud. From the engine unit 411, the nonlinear observer 403 is supplied with measured values of the propeller speed n and the motor torque Qm. The nonlinear observer 403 estimates values of the advance speed $\hat{u}_a$, for example by using eq. 15 in combination with an estimate of the propeller torque $\hat{Q}_p$ obtained from eq. A3 and A4. The estimated advance speed $\hat{u}_a$ is supplied to the calculation unit 404 where the average values of the estimated advance speed $\hat{u}_a$, obtained by using the low pass filter LPF, is subtracted from the estimated advance speed $\hat{u}_a$ to obtain the variation of the advance speed $\Delta \hat{u}_a$. From the static mapping function f, the variation of the propeller speed $\Delta n$ is obtained. By adding the variation of the propeller speed $\Delta n$ to the reference propeller speed $\bar{n}$, the optimal propeller speed nd is obtained, where the optimal propeller speed nd is optimal in the sense of optimising or maximising the ratio of the average power delivered to propel the vessel and the average power consumed by the prime mover as disclosed by eq. 16. The optimal propeller speed nd is supplied to the feedback controller 405, e.g. a PI controller using the measured propeller speed n as feedback, which generates values for the motor torque Qmc commanded to the engine unit 411—i.e. the Qmc values may control the engine's intake of fuel.

The skilled person will know that the control scheme shown in FIG. 4 is only one example of a control system for controlling the propeller speed. Closed-loop control methods may include closed-loop control of shaft speed, closed-loop control of shaft torque and shaft power control. The control loop can also include functions to prevent engine overload.

Accordingly, a controller for controlling the propeller shaft speed n using a computed optimal propeller shaft speed ua may include one or more controllers, e.g. PI controllers, utilising various control schemes, e.g. as depicted in FIG. 4. In particular, the controller 405 may be seen as a controller for controlling the propeller shaft speed using the computed optimal propeller shaft speed. However, since different control schemes may be utilised to realise propeller shaft control, also a control scheme as depicted in FIG. 5, including speed controller 401, reference generator 402 and PI controller 405, may be seen as a controller for controlling the propeller shaft speed. Accordingly, a controller for controlling the propeller shaft speed should be understood broadly as comprising any suitable control scheme utilizing any types of controllers, e.g. PID controllers, adaptive controllers and optimal controllers.

The controller is nonlinear in terms of the propeller shaft speed dynamics which includes nonlinear terms due to the nonlinear relation between the propeller shaft speed and the propeller torque and thrust. Basically the propeller model is nonlinear. This leads to the use of the nonlinear observer to estimate the advance speed (and propeller torque). Traditionally industrial solutions for the block "PI n controller" use a proportional and integral action (linear controller). More sophisticated control law may include nonlinear feedforward (to compensate for nonlinear friction torque) and nonlinear feedback terms to ensure faster convergence with respect to the linear controller. The so called "classical n reference generator" includes also a nonlinear function to compute the conventional shaft speed reference signal. To conclude, also the mapping from the estimated advance speed and delta n is nonlinear and, therefore, the controller in FIG. 4 is nonlinear.

It is understood that the calculation unit 404, the observer 403 and any of the controllers 401, 402, 405 may be implemented as software in a single computer or in a plurality of computers. Thus, each of the calculation unit 404, the observer 403 and any of the controllers may be implemented as a computer program on individual computers or the programs may be run on a single computer. Alternatively, one or more of the computing means, the observer and the controller may be hardware implemented on a printed circuit board or firmware implemented in a programmable computer chip. For example any of the controllers and the calculation unit 404 may be implemented as a propeller controller 420 in a single computer. Clearly, the observer 403 may also be implemented in the propeller controller 420 or may be implemented in a separate computer connected to the propeller controller 420.

Fast variations in the advance speed gives quick variations in the shaft speed that may increase the wear-and-tear of the mechanical part of the system. This can be avoided by decreasing the propeller torque observer gains (i.e. the gains L1 and L2 in eq. A2), reducing the high frequency content in the advance speed estimate. Moreover for diesel engines, the performances may be reduced due to the motor torque limitation that does not allow fast changes in the shaft speed, i.e the optimal shaft speed is a function not only of estimated advance speed but also of parameters such as motor torque, fuel command and scavenging air pressure.

Table 3 shows the average values of the total and propeller efficiency. The offline η optimizer controller produces an increase of the total efficiency of about 2.9% with respect to the conventional shaft speed controller (see "Blanke, M. and P. Busk Nielsen (1990). The marine engine governor. In: Proceedings Second International Conference on Maritime Communications and Control. Society of Marine Engineers. London, UK. pp. 11-20" which is hereby incorporated by reference) today's industrial standard for fixed pitch propeller. The total efficiency increased about 1.7% compared with the torque controller. The improvement may look tiny but for ships in ocean passage, the increase of the propulsion efficiency could result in essential savings. Also the reduction of fuel consumption may contribute to the reduction of $CO_2$ and other emissions.

Extrapolation to Ocean Passage

These results were obtained at experimental conditions with wave amplitude $\zeta_w^{exp}=2$ cm and propeller diameter $D^{exp}=25$ cm. This is equivalent to wave amplitude $\zeta_w^{ocean}=0.48$ cm of a containership with D=6 m diameter propeller. This wave amplitude is equivalent with a significant wave height $h_{1/3}=16/5\zeta_w=1.53$ m. Experiments conducted subsequently showed that the phenomena described in this paper are valid up to at least three times the wave height used here, i.e. up to a significant wave height of 4.6 m. Comparing with wave statistics from the North Atlantic, depicted in FIG. 7, the 82% of waves are within this limit and the average significant wave height in this group is 2.2 m. This implies that the total potential saving of the total fuel consumption could be increased up to 3.4% for ships in ocean passage employing constant shaft speed control, and up to 2.0% for vessels running in constant torque control mode.

In conclusion a novel control scheme for a marine propeller that operates in moderate sea and was able to increase the average propulsion efficiency over conventional propeller controller was disclosed. The main idea was to exploit the variation in the advance speed due to waves to increase the average propulsion efficiency without reducing the vessel speed. The shaft speed reference was computed as a solution of a nonlinear optimizing problem with constraints where regular waves were considered. Results were presented in simulations where the model employed was derived from experimental tests. An extrapolation to ocean passage predicted a potential fuel saving of up to 3.4% for vessels in ocean passage, without loss of speed.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method for increasing propulsion efficiency of a vessel by controlling a propeller shaft speed (n) using a computed optimal propeller shaft speed (Δn,nd), the vessel comprising a propeller driven by an engine and a controller for controlling the propeller shaft speed, the method comprising:
   estimating a propeller inflow speed (ua);
   computing the optimal propeller shaft speed as a function of the propeller inflow speed (ua), wherein computing the optimal propeller shaft speed is based on maximizing the propulsion efficiency being the ratio of power delivered to propel the vessel and power consumed by the engine; and controlling propeller shaft speed based at least in part on the computed optimal propeller shaft speed.

2. The method according to claim 1, wherein the optimal propeller shaft speed ($\Delta n, nd$) is computed using a static mapping function (fopt) which maps a value of the propeller inflow speed (ua) to a value of the optimal propeller shaft speed.

3. The method according to claim 2, wherein the static mapping function is determined based on maximizing the propulsion efficiency.

4. The method according to claim 1, wherein the optimal propeller shaft speed ($\Delta n, nd$) is computed using a static mapping function (fopt) which maps a variation of the propeller inflow speed ($\Delta ua$) to a variation of the optimal propeller shaft speed ($\Delta n$).

5. The method according to claim 4, wherein the static mapping function is determined based on maximizing the propulsion efficiency.

6. The method according to claim 1, wherein computing the optimal propeller shaft speed ($\Delta n, nd$) based on maximizing the propulsion efficiency is computed as the solution to an optimization problem subjected to the constraint of maintaining a constant vessel speed and/or the constraint of limiting the amplitude of thrust fluctuations.

7. The method according to claim 1, wherein the propeller inflow speed (ua) is computed from a measured propeller torque (Qp).

8. The method according to claim 1, wherein the propeller inflow speed (ua) is computed from an estimated propeller torque (Qp), where the estimated propeller torque (Qp) is computed based on measured motor torque (Qm) and measured shaft speed (n).

9. The method according to claim 1, further comprising:
computing a variation of the propeller inflow speed ($\Delta ua$) from an average of the a propeller inflow speed (ua); and
computing a variation of the shaft speed ($\Delta n$) from the variation of the propeller inflow speed ($\Delta ua$), wherein the optimum shaft speed (nd) is computed from the computed variation of the shaft speed ($\Delta n$) and a reference shaft speed (n).

10. The method according to claim 1, wherein the inflow speed is periodic with a wave period and wherein the optimal propeller shaft speed is computed by maximizing a ratio of power delivered to the propeller and power consumed by the engine averaged over an integer number of the wave periods.

11. The method according to claim 1, wherein the optimum propeller speed is determined as a function of the inflow speed, wherein the optimum propeller speed is determined under the constraint of maximizing the power efficiency of the propeller propulsion.

12. The method according to claim 1, further comprising supplying the computed optimal shaft speed to a controller capable of controlling the propeller shaft speed (n).

13. The method according to claim 1, wherein determining the optimum propeller speed comprises calculating a variation of a the propeller speed as a function of the inflow speed and combining the variation of the propeller speed with a reference propeller speed for obtaining the optimum propeller speed.

14. The method according to claim 1, wherein the inflow speed comprises a speed component of wave induced inflow speed (uw) caused by waves passing the propeller.

15. A system for a vessel for increasing propulsion efficiency by controlling a propeller shaft speed (n) using a computed optimal propeller shaft speed ($\Delta n, nd$), wherein the vessel comprises a propeller driven by an engine and a controller for controlling the propeller shaft speed, comprising:
at least one processor;
a nonlinear observer configured to estimate a propeller inflow speed (ua);
a computing means configured to compute the optimal propeller shaft speed (nd) as a function of the propeller inflow speed (ua), wherein computing the optimal propeller shaft speed is based on maximizing the propulsion efficiency being the ratio of power delivered to propel the vessel and power consumed by the engine;
outputting means configured to output a control signal for controlling the propeller shaft speed based at least in part on the computed optimal propeller shaft speed.

16. A vessel comprising:
a propeller driven by an engine;
a controller for controlling a propeller shaft speed (n); and
a system for increasing propulsion efficiency by controlling the propeller shaft speed (n) using a computed optimal propeller shaft speed ($\Delta n, nd$), wherein the system comprises
a nonlinear observer configured to estimate a propeller inflow speed (ua),
a computing means configured to compute the optimal propeller shaft speed (nd) as a function of the propeller inflow speed (ua), wherein computing the optimal propeller shaft speed is based on maximizing the propulsion efficiency being the ratio of power delivered to propel the vessel and power consumed by the engine, and
outputting means configured to output a control signal for controlling the propeller shaft speed based at least in part on the computed optimal propeller shaft speed.

17. A non-transient computer readable medium having instructions stored thereon that cause an electronic processor to perform a method for increasing propulsion efficiency of a vessel by controlling a propeller shaft speed (n) using a computed optimal propeller shaft speed ($\Delta n, nd$), wherein the vessel comprises a propeller driven by an engine and a controller for controlling the propeller shaft speed, and wherein the method comprises estimating a propeller inflow speed (ua), computing the optimal propeller shaft speed as a function of the propeller inflow speed (ua), wherein computing the optimal propeller shaft speed is based on maximizing the propulsion efficiency being the ratio of power delivered to propel the vessel and power consumed by the engine, and outputting a control signal for controlling the propeller shaft speed based at least in part on the computed optimal propeller shaft speed.

* * * * *